Figure 2:
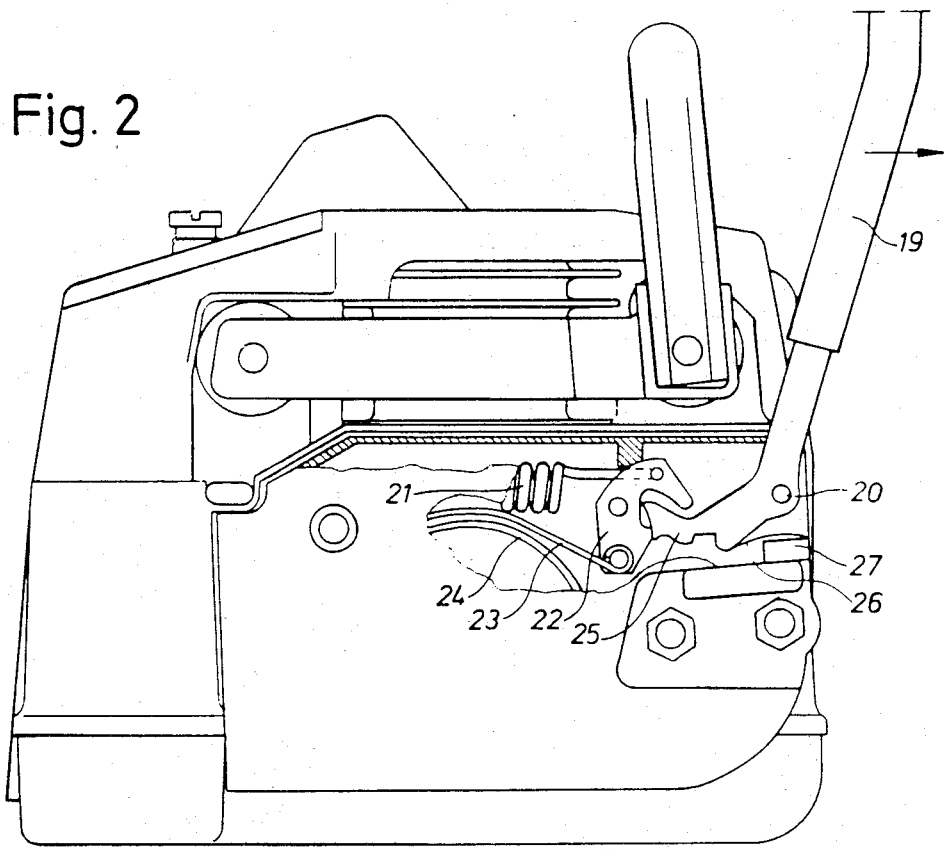

United States Patent [19]

Andreasson

[11] Patent Number: 4,553,517
[45] Date of Patent: Nov. 19, 1985

[54] IGNITION SYSTEM WITH ADDITIONAL FUNCTIONS

[75] Inventor: Bo C. Andreasson, Gothenburg, Sweden

[73] Assignee: Aktiebolaget Electrolux, Stockholm, Sweden

[21] Appl. No.: 596,943

[22] Filed: Apr. 5, 1984

[30] Foreign Application Priority Data

Apr. 15, 1983 [SE] Sweden ................................ 8302113

[51] Int. Cl.⁴ ............................................. F02P 5/14
[52] U.S. Cl. .................................. 123/417; 123/335; 123/418; 123/424
[58] Field of Search ............... 123/417, 418, 424, 335, 123/334, 416

[56] References Cited

U.S. PATENT DOCUMENTS

| | | | |
|---|---|---|---|
| 4,127,092 | 11/1978 | Fresow et al. | 123/418 |
| 4,133,325 | 1/1979 | West | 123/424 |
| 4,376,428 | 3/1983 | Hata et al. | 123/417 |
| 4,378,769 | 4/1983 | Haubner et al. | 123/417 |

*Primary Examiner*—Andrew M. Dolinar
*Attorney, Agent, or Firm*—Alfred E. Miller

[57] ABSTRACT

A microcomputer is used in the invention for control of the ignition functions of an ignition system of an i.c. engine. A switch (17) in an operating handle or the like is connected via a transistor to a digital input of the computer. This reads the status of the switch once every revolution of the engine and as long as the switch is closed the ignition is delayed at an r.p.m. above a predetermined, programmed value (e.g. 3000 r.p.m.) and the r.p.m. of the engine is restricted. When the engine shall work the switch is opened and the ignition is normal. The restriction is used at start in order to avoid speeding during the start procedure. As a complement to said switch a parallel switch (27) can be connected and operated by a brake device of the engine. During braking the r.p.m. of the engine is thereby restricted to the same value as the r.p.m. during the start.

2 Claims, 5 Drawing Figures

IGNITION SYSTEM WITH ADDITIONAL FUNCTIONS

The present invention relates to an ignition system for an i.c. engine having an ignition generator generating a pulsatory primary voltage.

When starting power hand tools, for instance power chain saws, a throttle control is locked in a starting position and causes the tool to start racing while starting. In order to decrease the risk of accident during the start procedure, several arrangements has been presented which restrict the r.p.m. of the engine during starting. A restriction of r.p.m. has advantages also in situations other than that starting, for instance upon the occurrence of a powerful braking of the engine.

The present invention providing an arrangement for use in combination with a centrifugal clutch on the shaft of the engine and to work in such a way that simultaneously with the locking of the throttle control in the starting position or, alternatively, the engagement of a braking mechanism, a circuit of the ignition system is switched in and prevents ignition at an r.p.m. which is above the switching r.p.m. of the centrifugal clutch. When the arrangement is applied to a motor saw the chain will be at rest during starting or, in use, be brought to a stop rapidly upon an emergency braking of the saw.

Figure 1:
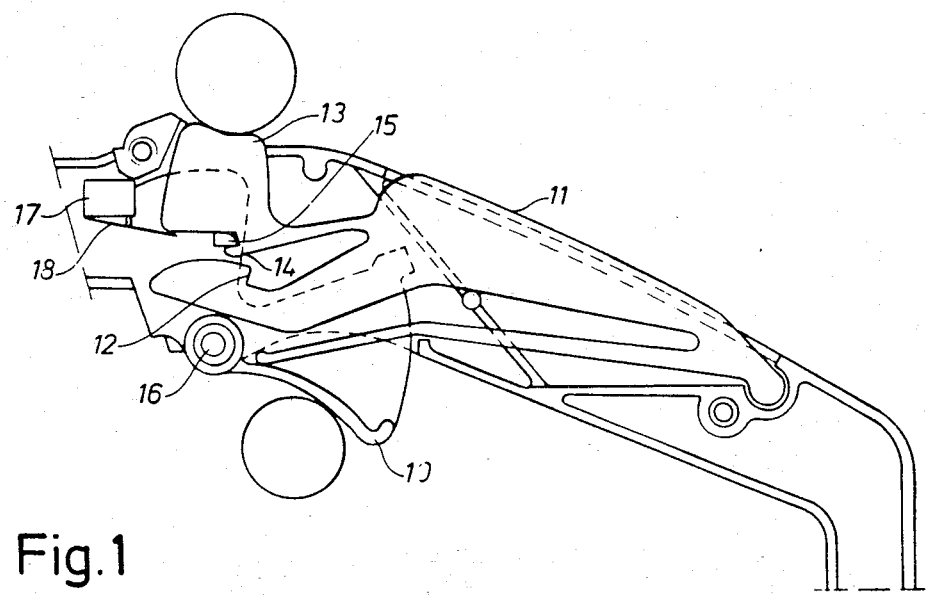
Figure 3:
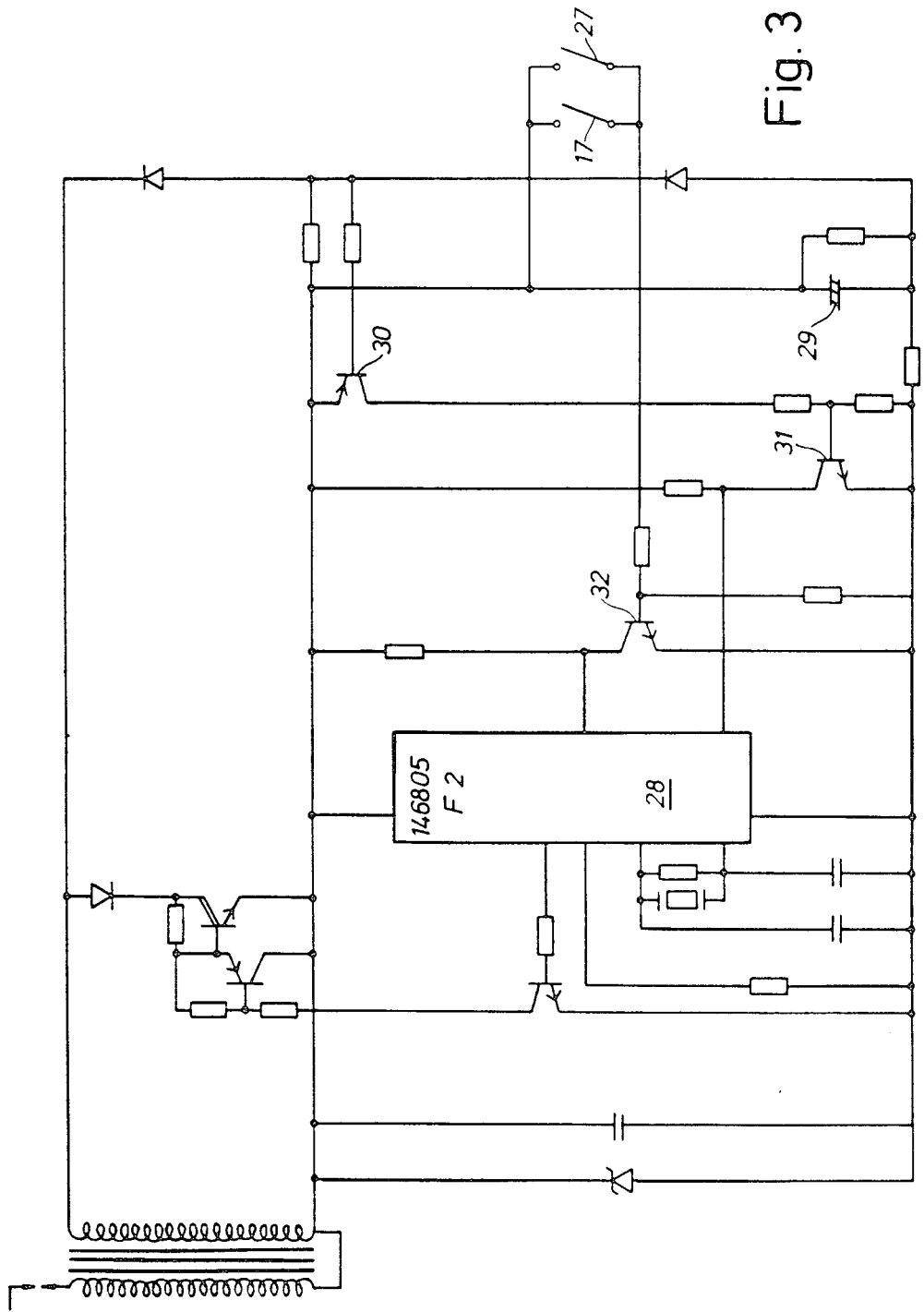
Figure 4:
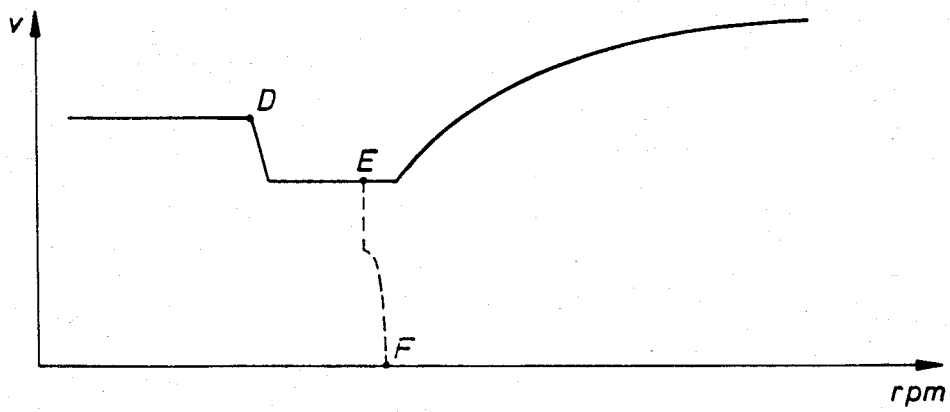

An embodiment of an arrangement according to the invention will be described in the following with reference to the accompanying drawings which show in:

FIG. 1 a handle with a throttle control of a power tool (motor saw),

FIG. 2 a braking mechanism of the motor saw,

FIG. 3 a wiring diagramme of an ignition system including the invention,

FIG. 4 an ignition timing diagramme, and

Figure 5:
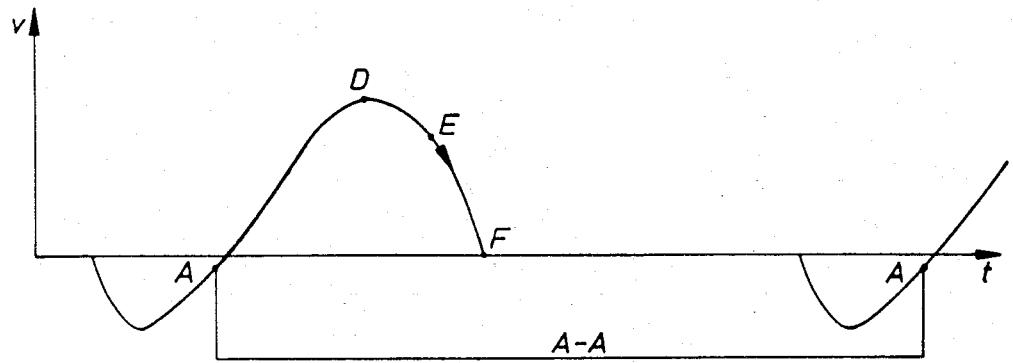

FIG. 5 a primary voltage curve.

The handle illustrated in FIG. 1 is the rear handle of a motor saw, and it comprises i.a. a finger grip 10 for the control of a throttle, a hand grip in the form of a lever 11 with a pawl 12 for locking the finger grip in an idle position, generally called "a stop for unintentional speeding", and a start position knob 13 which also has a pawl 14. The pawls 12 and 14 cooperate with a nose 15 on the grip 10, the grip being journalled on a shaft 16 in the frame of the handle. When the grip is rotated about the shaft the nose moves in a circular path so that the pawls can be introduced or withdrawn by manual operation of the lever and the knob, respectively.

The start position knob 13 described is used for the actuation of a switch 17 which is a part of the electric ignition system, shown in FIG. 3. When the start position knob 13 is depressed and the grip 10 set on start position the grip is retained in the position in the way shown in FIG. 1. The knob 13 has been pressed to its innermost position and in turn presses on a switch arm 18 of the switch 17 which then is actuated.

The brake mechanism is shown at the forward end (FIG. 2) of the motor saw body and is normally operated by the stirrup 19. When the stirrup is swung forwards, for instance by the operator's hand, about a shaft 20, a braking action is released by a spring 21 tensioned between a stationary point and a double armed lever 22. A brake band 23 around the centrifugal clutch drum 24 of the saw is thus tensioned and brakes the drum. The protection effect thereof is that the saw chain is stopped at the occurrence of a kick-back, if the operator's hand strikes the stirrup 19. During use of the saw (FIG. 2) a sear 25 is in locking engagement with the double armed lever 22. The sear then pressed on a switch arm 26 of a switch 27 which also is a part of the electric ignition system. Upon release of the brake the sear moves from the switch arm so that the switch is closed.

A wiring diagramme of the ignition system is shown in FIG. 3, here provided with a microcomputer 28. The current supply to the electronic circuits and the computer is derived from the negative half-waves of the primary winding voltage of an ignition generator (the voltage curve is shown at the top, to the left of FIG. 5), which keeps a capacitor 29 charged to an operating voltage. A transistor amplifier 30, 31 is provided for feeding pulses reference voltage point on the voltage curve. In in the present case the reference point is 0.6 V before the curve passes zero on the ascending part thereof. The pulse is supplied to the computer as a start signal of a procedure which is herewith described in broad outline.

The input to which the signal is supplied is scanned by the microcomputer and the time A is stored as reference time. This storing is possible since the microcomputer has a timer running at a fixed frequency. At every reference time the number of timer pulses occurring since the preceding reference point is registered (the period A—A) of FIG. 5. This number of pulses corresponds to 360° rotation of the crankshaft. By dividing the number of pulses by a predetermined number, e.g. 16, a number of pulses remains which corresponds to an advanced ignition of 360/16=22.5°. This number is called the reference number and is a memory data stored in the static memory of the computer. The reference number can be dependent on the r.p.m. and is at low r.p.m. inversely proportional (a straight horizontal line in FIG. 5). When the number of timer pulses reaches the said reference number (by comparing the numbers in an AND-circuit) in the microcomputer the ignition is initiated via an output of the computer. The timer is set to zero every time the reference point passes and the counting to the reference number takes place for every spark.

In order to reach stability in the idle r.p.m. and restriction of the r.p.m. it is desirable to accurately control the ignition timing. Moreover, it may be possible to use an optimal ignition timing at several working r.p.m. by a registration of the number of timer pulses between two reference points A—A. Then the number of timer pulses makes a direct (or indirect) reading of the address in the memory of the computer where a number indicating the ignition timing is stored. This number states the sum of timer pulses between the reference point and the ignition time in the same way as in the case of a low r.p.m., but the ignition time is advanced at high r.p.m. as shown in FIG. 4.

According to the diagramme of FIG. 3 the switches 17 and 27 are connected via a transistor 32 to a digital input of the microcomputer. The microcomputer reads the status of this input once per revolution of the crankshaft, and if one of the switches is closed, the ignition is delayed by a predetermined r.p.m. There is a row of positions in the memory where reference numbers for the delayed ignition are stored. When one of the switches is closed and thereby a signal is present on said input, the computer reads the reference numbers in these positions and the ignition is intentionally delayed in relation to normal idling. In FIGS. 4 and 5 several parts of the curves are marked with letters and the relation is as follows:

When the switches are open the ignition in idling follows the curve part D-E. When one of them is closed, the ignition is delayed to the part E-F and at F there will be no ignition energy as the current is zero. The dashed curve in FIG. 4 shows the ignition curve when switches 17, 27, respectively, are closed. When these switches are open the continuous curve is valid showing the normal ignition, idling and working r.p.m., respectively. I claim:

1. In an ignition system for an internal combustion engine, wherein the ignition system includes an ignition generator with a winding for producing a voltage that varies cyclically with engine rotation, a microcomputer connected to control the speed of the engine by controlling the timing of the ignition thereof, the microcomputer including a first memory portion for storing first control characteristics for controlling the timing of the ignition as a function of a first input to the microcomputer, and means applying a signal to said first input in response to a determined amplitude of said voltage; the improvement comprising a start switch connected to apply a signal to a second input of said microcomputer, said microcomputer having a second memory portion for storing second control characteristics controlling the timing of the ignition as a function of the first input in the microcomputer, said second control characteristics permitting a lower maximum speed than said first control characteristics, in response to said second input, whereby the speed of said engine is limited upon starting.

2. The ignition system of claim 1 wherein said engine comprises a brake, and means responsive to operation of said brake for applying said second input to said microcomputer, whereby the maximum speed of said engine is limited on braking.

* * * * *